Oct. 13, 1953 — A. C. ALLEN — 2,654,907
WINDSHIELD CLEANER
Filed Aug. 19, 1949 — 3 Sheets-Sheet 1

Inventor
Arthur C. Allen
By Hinkle, Horton, Ahlberg, Hansmann & Wupper
Attorneys.

Oct. 13, 1953  A. C. ALLEN  2,654,907
WINDSHIELD CLEANER
Filed Aug. 19, 1949  3 Sheets-Sheet 2

Inventor
Arthur C. Allen

Patented Oct. 13, 1953

2,654,907

UNITED STATES PATENT OFFICE 2,654,907

WINDSHIELD CLEANER

Arthur C. Allen, Chicago, Ill., assignor to Stewart-Warner Corporation, Chicago, Ill., a corporation of Virginia Application August 19, 1949, Serial No. 111,270

20 Claims. (Cl. 15—253)

The present invention relates to windshield cleaners and more particularly to a cleaner including mechanism for oscillating a plurality of wiper blades in out-of-phase relation and for parking them automatically at the same position relative to the windshield when the cleaner stops operating.

The amount of torque required to oscillate a windshield wiper blade varies considerably throughout the stroke of the blade. Since mechanically driven cleaners ordinarily have a flexible drive shaft for driving the cleaner operating mechanism from a rotary part of the engine of the vehicle in which the cleaner is installed, this shaft in conventionally operating cleaners is required to transmit torque of widely varying magnitude depending on the position of the wiper blades in their stroke. This has a deleterious effect on the flexible drive shaft because it causes the latter to wind up and unwind with the variations in torque. As a result, the flexible shafts wears much faster than one applying a uniform torque. This disadvantage of conventional windshield cleaners having two wiper blades has, to a large extent, been avoided in the cleaner of the present invention by providing mechanism for oscillating a plurality of wiper blades out of phase.

Accordingly, an object of the invention is to provide a windshield cleaner embodying mechanism for oscillating a plurality of wiper blades out of phase.

Another object of the invention is to provide a windshield cleaner, embodying mechanism as set forth in the preceding object, which parks the blades automatically at the same position relative to the windshield, namely, at the outermost limit of the stroke of the blades.

A further object of the invention is to provide a new and improved windshield cleaner as set forth in the preceding objects, having a single manually operable control to control operation of the cleaner.

A still further object of the invention is the provision of a new and improved windshield cleaner embodying operating mechanism for oscillating a plurality of wiper blades which includes a lost motion driving connection and a manually operable control operable to render the lost motion driving connection effective to cause the wiper blades to be oscillated in out-of-phase relation when the cleaner is operating, and operable to cause lost motion to be taken up before the cleaner stops operating when the control is operated to discontinue operation of the cleaner.

Yet another object of the invention is to provide a new and improved windshield cleaner embodying operating mechanism for oscillating a pair of wiper blades permanently drivingly connected to one wiper blade and including a disengageable driving connection between the second blade and operating mechanism and a control operable to start operation of the cleaner and temporarily to disconnect the driving connection to the second blade and temporarily to disconnect the driving connection to this wiper blade when the control is operated to discontinue operation of the cleaner.

A more general object of the invention is to provide a windshield cleaner as set forth in the preceding objects which may be made primarily from inexpensive sheet metal stampings and standard parts and which is easy to assemble and install so that it may be sold and installed at relatively low cost but which nevertheless is sturdy and not subject to breakdowns.

These and other objects, advantages, and capabilities of the invention will become apparent from the following description wherein reference is had to the accompanying drawings in which:

The basic operating mechanism of the windshield cleaner of the present invention is similar to that of the windshield cleaner disclosed in the application for patent of John Victor Stanley Dahlgren, Serial No. 71,924, filed January 21, 1949, and entitled "Windshield Cleaner," said application having matured into Patent No. 2,600,622, June 17, 1952. The construction and operation of the elements in the windshield cleaner of the present application which are similar to those in the cleaner disclosed in the above mentioned application for patent have not been described in detail because a complete disclosure of the same is contained in that application.

Figure 1:
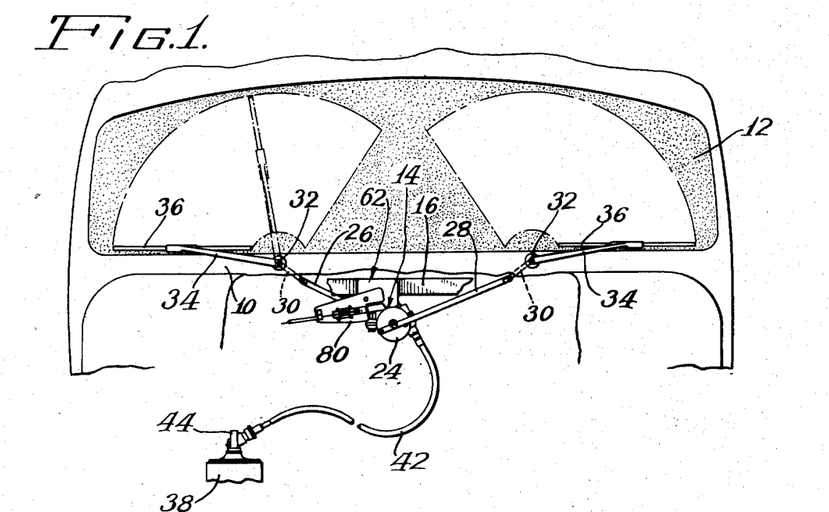
Fig. 1 is a more or less diagrammatic front elevational view of a fragment of an automotive vehicle showing the improved cleaner of the present invention secured therein.

In Fig. 1 the improved windshield cleaner of the present invention is shown applied to an automotive vehicle having a cowl 10 and the windshield 12. The improved windshield cleaner includes operating mechanism 14 supported under the cowl and behind the instrument panel of the vehicle from a channel-shaped supporting bar 16 suspended adjacent opposite ends from the framework of the vehicle.

The operating mechanism 14 includes a rotatable actuating shaft 18 (Figs. 5 and 6) which rotates a rear crank arm 20 permanently secured thereto, and front motion translating and clutch structure which includes a disc-shaped driven member 24 that may be drivingly connected to or disconnected from the actuating shaft. The crank arm 20 and the driven disc 24 reciprocate a pair of oppositely extending links 26 and 28, respectively (Fig. 1), which are connected to crank arms 30 fixed to a pair of rock shafts 32 so that the latter are rocked when the links are reciprocated. A pair of wiper blade arms 34 to which wiper blades 36 are secured are oscillated by these rock shafts. The structure of the wiper blades and blade arms and the links, and the manner in which these parts are interconnected and mounted in the vehicle, may be as in the previously mentioned Patent No. 2,600,622.

The operating mechanism 14 is driven from the shaft of an engine accessory such as the generator indicated at 38 in Fig. 1 through a flexible drive shaft or cable 40 enclosed in a flexible housing 42. A power takeoff 44 (Fig. 7) is provided on one end of the generator which includes a worm wheel 46 in permanent driving engagement with a worm (not shown) on the end of the generator shaft. Worm wheel 46 rotates a shaft 48 which has a clutch element 50 formed on its outer end for establishing a driving connection between the power takeoff 44 and the flexible drive shaft 40.

Figures 6, 7, 8:
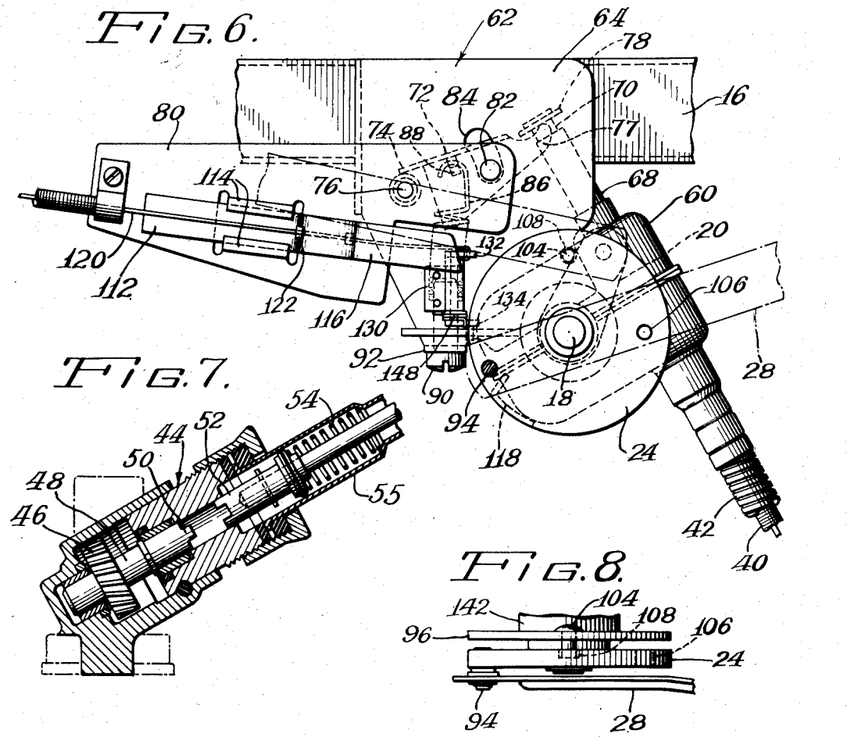
Fig. 6 is a fragmentary front elevational view similar to Fig. 2 but showing the parts in the position they assume when the cleaner is operating.
Fig. 7 is an axial sectional view on an enlarged scale through the power takeoff which drives the flexible drive shaft, showing a clutch means for connecting this drive shaft to a rotary source of power.
Fig. 8 is a fragmentary top plan view of a portion of the operating mechanism of the cleaner with the parts in the position they assume when the cleaner is operating.

Fixed to the lower end of this latter shaft is a clutch element 52 supported in the power takeoff housing for rotary movement and for movement axially into and out of engagement with the driving element 50. A coil spring 54 in a rigid tubular extension 55 on the lower end of the housing 42 for the flexible drive shaft 40 urges the driven clutch element 52 in a direction to bring the latter into driving engagement with the driving element 50. The power takeoff, flexible drive shaft, and its housing, and the clutch elements may be of the same construction and assembled in the same manner as the corresponding parts of the windshield cleaner disclosed in the previously mentioned application for patent.

The operating mechanism 14 includes a worm 56 (Fig. 5) which is rotated by the flexible shaft 40 and which drives a worm wheel 58 on the actuating shaft 18. Worm 56 and the actuating shaft 18 are rotatably supported in suitable bearings in a gear box 60 as described in the previously mentioned application for patent, Serial No. 71,924. The upper end of the flexible drive shaft housing 42 is secured to this gear box, and the latter is supported from the supporting bar 16 by a generally U-shaped mounting bracket 62 (Figs. 2 and 3) which has a front wall or flange 64 and a back wall or flange 66. A portion of the gear box nests between these walls and is rigidly secured thereto by suitable means. The back wall of the bracket is fixed adjacent its upper end to the supporting bar 16 to hold the same on the bar.

Worm 56 is hollow and has an axially slotted extension 68 (Figs. 2 and 5) which projects upwardly from the upper side of the gear box 60. Secured to the upper end of the flexible drive shaft 40 is a rigid extension 70 which has a radially projecting lug. This lug engages in the slot in the extension on the worm to form a driving connection between the shaft and worm. Since the extension 70 is loosely received in the hollow worm 56, while the flexible shaft 40 is loosely received in its housing 42, and the driven clutch element 52 on the lower end of the flexible shaft is movable axially of the power takeoff 44, this entire shaft assembly may be moved axially as a unit. Normally it is urged by the spring 54 in a direction to bring the driven clutch element 52 into driving engagement with the driving element 50.

Declutching mechanism to move the flexible shaft assembly in a direction to break the driving connection between the clutch elements 50 and 52 is provided including an inverted generally U-shaped yoke or lever 72 (Figs. 2 and 6) movably supported between the front and back walls of the mounting bracket 62. At its rear end (lefthand end in Fig. 2) the lever 72 has a rearwardly projecting lug 74 adapted to seat or engage upon a main fulcrum pin 76 which extends transversely of the mounting bracket 62 and has an end that projects forwardly from the front wall 64 of this bracket. At its forward end the lever 72 is provided with forwardly projecting ears 77 which straddle the upper end of the extension 70 on the flexible drive shaft 40 and engage the underside of an enlarged end cap 78 on the upper end of this extension.

A movable support or fulcrum for the lever 72 is provided by a control plate 80 pivotally secured upon the forwardly projecting end of the main fulcrum pin 76. Lever 72 and control plate 80 are interconnected by a pin 82 fixed to the control plate 80 and extending through an arcuate slot 84 in the front wall 64 of the mounting bracket 62 so that the end of this slot defines the limits of pivotal movement of the control plate. The lever 72 is loosely received upon the pin 82 so that the plate and lever may be rocked together and the latter is rockable relative to the control plate.

Lever 72 is biased by a coil spring 86 hooked at its upper end through a lug 88 struck from the web of the yoke or lever 72. At its lower end the spring 86 is engaged in a spiral groove in a headed pin or stud 90 which passes freely through an aperture in a rearwardly bent ear 92 on the lower edge of the front wall 64 of the supporting bracket. By virtue of this construction, the tension in the spring 86 can be adjusted by turning the stud 90 in one direction or the other, depending on whether more or less tension is desired in the spring. Since the lever 72 is connected to the control plate 80, the biasing effect of spring 86 will also be exerted on the control plate.

By reason of the interconnection between the lever 72 and control plate 80 through the pin 82 and the loose connection between the rear end of the lever and the fulcrum pin 76, the lever may pivot or rock about its rear end upon the fulcrum pin 76 or its rear end may float relative to the fulcrum pin when the lever rocks on pin 82. The stages in the operation of the declutching mechanism at which it rocks and those at which it floats will be explained in detail subsequently. Due to the fact that the spring 86 is always under tension, the control plate 80 and lever 72 normally will be urged to the position shown in Fig. 6. At this position of the parts the clutch elements 50 and 52 are held in driving engagement by spring 54.

Figure 2:
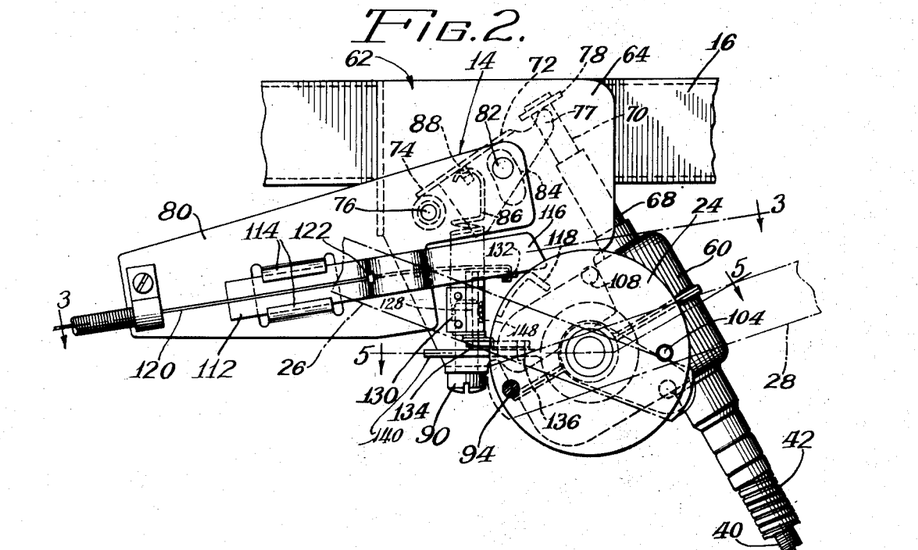
Fig. 2 is a fragmentary front elevational view of the cleaner operating mechanism showing the position the parts assume when the cleaner is inoperative.

When the parts are rocked in a counterclockwise direction in opposition to the biasing force of the spring 86, they will ultimately assume a position substantially as shown in Fig. 2. At this position of the parts the flexible shaft assembly has been moved axially upwardly by the forward end of the lever 72 sufficiently so that the driving connection between the clutch elements 50 and 52 is broken. The portion of the declutching mechanism thus far described may be of the same construction as the corresponding parts of the windshield cleaner disclosed in the aforementioned Patent No. 2,600,622, and may operate in the same manner. However, the mechanism for rocking the control plate 80 and lever 72 in the cleaner of the present invention differs somewhat in construction from that used in the cleaner of this prior application, but like that mechanism it operates in coordinated relation with the structure which oscillates the wiper blade arms so that the blades are always stopped at parked position.

As previously explained, this latter structure includes the rear crank arm 20 which is fixedly secured upon the rear end of the actuating shaft 18 and the driven disc 24 on the front end of this shaft. Crank arm 20 rocks the left-hand wiper blade arm rock shaft 32, as seen in Fig. 1, through the link 26. The other wiper blade arm rock shaft is rocked by the link 28 which is reciprocated by the driven disc 24, to which it is secured by means of a pin 94 extending through one end of link 28 and into the disc adjacent its periphery, suitable spacing washers or other spacing means being interposed between the link and the driven disc. This disc is rotatably received upon the forward end of the actuating shaft 18, but is locked against axial movement relative thereto in any suitable manner.

A driving connection between the driven disc 24 and actuating shaft 18 is established through a disc-shaped drive member 96 which has a rearwardly extending hub 98. The forward end of this hub is cylindrical and loosely receives a rearwardly extending hub 100 on the driven disc 24 so that these two parts may rotate freely relative to each other while its rear end has a square aperture adapted to be received upon a squared portion 102 of the actuating shaft 18 to form a permanent driving connection between these parts.

Figure 3:
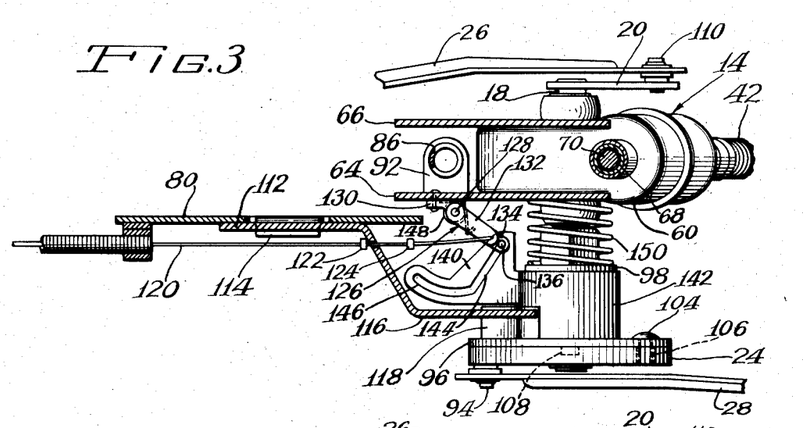
Fig. 3 is a longitudinal transverse sectional view of the cleaner operating mechanism taken on the line 3—3 of Fig. 2.

Adjacent the periphery of the drive disc 96 a drive pin 104 is fixedly secured, and the driven disc has an aperture 106 extending through the same and a recess 108 extending only partway through the disc spaced angularly 270° forward of the aperture in the direction of rotation of the actuating shaft and drive disc 96, i. e., in a clockwise direction, as seen in Figs. 2 and 3. Drive pin 104 may be received in either the aperture or the recess. Inasmuch as the drive pin 104 is in the same angular position relative to the shaft 18 as a pin 110 connecting the back link 26 to the crank arm 20 and the aperture 106 in the driven disc 24 will be in this same angular position when the drive pin 104 is engaged therein while the pin 94 connecting the front link 28 to this disc (Fig. 5) is approximately 180° removed from this position, the two wiper blades 36 will be in phase or in other words in the same position relative to the windshield when the drive pin 104 is in this aperture.

However, when the drive pin 104 is in recess 108, the drive pin and the crank arm 20 will be displaced angularly approximately 90° with respect to the pin 94 connecting the front link 28 to the driven disc 24. As a result the blade connected to this crank arm, i. e., the left-hand blade (Fig. 1), will be at a position in its oscillation approximately 270° ahead of the right-hand blade so that the two blades are displaced relatively in their stroke approximately 90°. In Fig. 1 the parts are shown at the position they assume when the drive pin 104 (Fig. 2) is about to drop into recess 108 and thus establish a driving connection with the driven disc 24 to cause the right-hand blade to oscillate. At this time the left-hand blade 36 has been moved from its extreme left-hand or parked position (shown in full lines) to its extreme right-hand position, and from this latter position approximately halfway back to its first mentioned position as indicated in phantom. As long as the drive pin remains in recess 108 the blades will oscillate at approximately 90° displacement with one blade trailing the other.

At this displacement of the blades or some other displacement which causes one blade to be in an advanced position in its stroke relative to the other blade there is less fluctuation in the torque required to drive the operating mechanism because the periods at which maximum and minimum torque are required to oscillate each blade are not concurrent. Thus there is less winding and unwinding of the flexible drive shaft when the cleaner is operating and as a result less wear on this shaft. The improved operating mechanism of the present invention is designed normally to operate the wiper blades approximately 90° out of phase in their stroke in order to reduce wear on the flexible shaft 40.

However, in order to park both blades at the same position relative to the windshield, preferably at the outermost limit of their stroke, they must be brought into phase at approximately 180° displacement before operation of the cleaner is discontinued. The mechanism for causing the blades to shift into and out of this relationship operates in conjunction with declutching mechanism for starting and stopping operation of the cleaner and is controlled by the same manual control which conditions the declutching mechanism for operation.

Figures 4, 5:
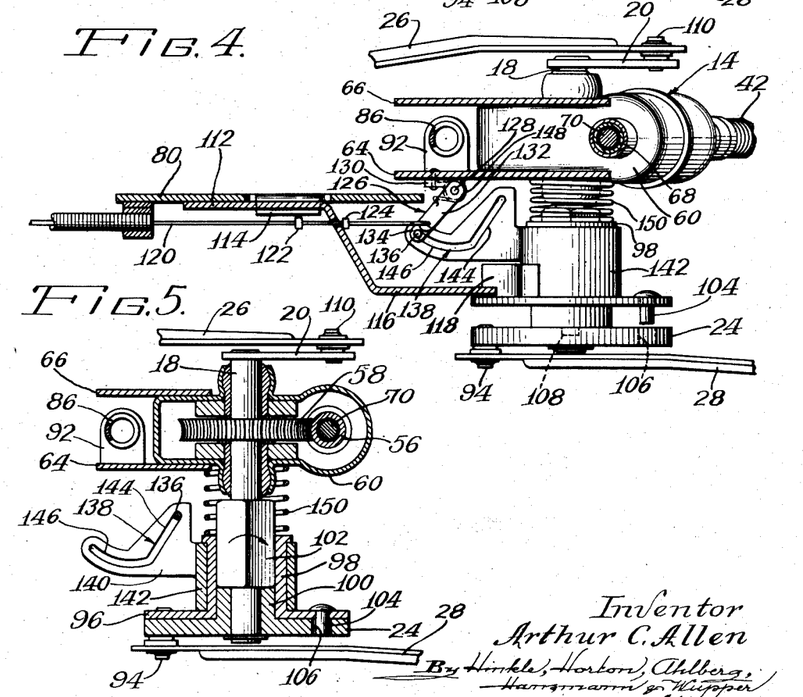
Fig. 4 is a cross-sectional view similar to Fig. 3 but showing the position the parts assume when the cleaner is about to become operative.
Fig. 5 is a transverse sectional view taken on the line 5—5 of Fig. 2 with the parts shown in thet position they assume when the cleaner is inoperative.

The mechanism for rocking the control plate 80 and lever 72, and thereby declutching the flexible drive shaft 40, includes an abutment member or slide 112 (Figs. 2 and 3) slidably carried between parallel slide forming lugs 114 swaged in the body of the control plate. Slide 112 has an offset portion 116 at its forward end (Figs. 3 and 4). When the slide is in advanced position, this offset portion projects into the path of rotation of a lug 118 projecting axially from the back side of the drive disc 96, as indicated in Fig. 3. The slide may be retracted sufficiently from this advanced position to move its offset end out of the path of rotation of the lug 118, as indicated in Fig. 6.

Slide 112 is moved by a control cable 120 such as a Bowden wire which is manipulated by means of a control knob (not shown), preferably located on the instrument panel of the vehicle. At its lower end the Bowden wire passes freely through an aperture in the offset portion 116 of the slide and a lost motion connection with the slide is provided by a pair of spaced abutments 122 and 124 fixed on the wire 120 on opposite sides of the offset 116.

In Fig. 6 the parts of the windshield cleaner are shown in the position they assume when the cleaner is operating. To declutch the flexible drive shaft 40 and thereby stop the cleaner, the slide 112 must be moved forward (to the right in Fig. 6) to the position shown in Fig. 2. When the lug 118 on the drive disc 96, which rotates in a clockwise direction, strikes the underside of the slide, it rocks the control plate 80 counterclockwise upon the main fulcrum pin 76 from the position shown in Fig. 6 to the position shown in Fig. 2.

Since the lever 72 is connected to the control plate 80 by the pin 82 which forms an axis for the lever, movement of the control plate shifts this axis around fulcrum pin 76 against the resistance of the adjusting spring 86 connected to the lever and the flexible shaft biasing spring 54 which acts through this shaft on the forward end of the lever 72. Friction between the clutch elements 50 and 52, when the cleaner is operating, greatly increases the resistance of the flexible drive shaft to axial movement, although once these elements start to separate, this resistance is greatly reduced due to the resulting reduced area of contact between these parts.

In order to secure declutching with a snap action, the spring 86 is so adjusted that the resistance of the flexible shaft to axial movement during the initial portion of the rocking movement of the control plate 80 is greater than the resistance of the spring 86. As a result, during this initial interval, the forward end of the lever 72 remains stationary and the rear end rises relative to the fixed fulcrum 76, thereby increasing the counterclockwise force which the spring 86 exerts on the rear end of the lever 72.

Before the lug 118 overruns the slide 112, the tension in the spring 86 is increased sufficiently to start axial movement of the flexible drive shaft upwardly. Once this shaft starts to move, the reduced area of contact between the clutch elements 50 and 52 reduces the frictional resistance of the flexible shaft to axial movement to such an extent that the spring is able to rock the lever 72 counterclockwise with a snap action and thus declutch the flexible shaft instantaneously. Furthermore, declutching is made to occur when the blades are at parked position by locating the lug 118 substantially diametrically opposite the pin 110 connecting the link 26 to the rear crank arm 20, and since the torque required to turn the operating mechanism is at a minimum when the blades reach parked position there will be less frictional resistance to declutching at this time so that it more readily occurs with a snap action. The relatively large frictional resistance between the blades and the windshield prevents overrunning when the flexible drive shaft is declutched. It will be apparent that the time at which declutching occurs can be varied somewhat by adjusting the spring 86.

In addition to operating the slide for the purpose above described, the Bowden wire 120 also operates mechanism for causing the blades normally to operate out of phase displaced 90° from each other and to be brought into phase immediately prior to the time that the flexible drive shaft is declutched so that the blades will both park at the same position relative to the windshield.

This mechanism includes a lever indicated in its entirety at 126 comprising a shaft 128 (Figs. 2 and 3) rotatably supported by a bracket 130 secured to the front wall of the mounting bracket 62. Fixed to the opposite ends of this shaft is a pair of lever arms 132 and 134. The lower lever arm 134 has a depending lug or roller 136 which engages in a cam slot 138 in a flange 140 extending radially from a collar 142 surrounding the hub on drive disc 96. Collar 142 is fixed against axial movement relative to the drive disc in any suitable manner, but the latter is rotatable relative to the collar.

Slot 138 has an inclined portion 144 and an arcuate portion 146 having its center at the axis of the shaft 128. A suitably mounted torsion spring 148 biases the lever 126 in a counterclockwise direction (as seen in Figs. 3 and 4) or, in other words, in a direction to move the lug 136 out of the arcuate portion 146 of the cam slot.

The Bowden wire 120 is connected at its lower end to the upper arm 132 on lever 126. By retracting this wire to its full extent, the lever 126 may be swung clockwise (Fig. 3) far enough to move the lug 136 from the top of the inclined portion 144 of the cam slot 138 to the outer end of the arcuate portion 146. During movement of the lug 136 from the upper to the lower end of the inclined portion 144 of the slot, the collar 142 is fully retracted and fully retracts drive disc 96 away from the driven disc 24. As the lug 136 moves in the arcuate portion 146 of the cam slot the collar and drive disc 96 are held in stationary retracted position.

The torsion spring 148 is strong enough to rock the lever 126 counterclockwise when the Bowden wire is released far enough to carry lug 136 out of the arcuate portion 146 of the cam slot into the inclined portion 144 and to draw the Bowden wire forward with the lever. A coil spring 150 on the shaft 18 between the drive disc 96 and the front wall of the mounting bracket 62 biases the drive disc 96 toward the driven disc 24. Thus, when the lug 136 on lever 126 moves into the inclined portion 144 of the cam slot under the influence of torsion spring 148, the spring 150 thereafter automatically moves the drive disc axially toward the driven disc 24.

The stops 122 and 124, providing lost motion between the Bowden wire 120 and slide 112, are so arranged that lost motion in a forward direction between stop 122 and the retracted slide 112 will not be taken up until lever 126 has swung lug 136 from fully retracted position through the arcuate portion 146 of the cam slot and partway up the inclined portion 144. The distance the lug may move up the inclined part of the cam slot before the stop 122 becomes operative against slide 112 should be greater than the distance it moves when the drive pin 104 is brought into engagement with recess 108 so that the drive pin and recess may be brought into driving engagement without drawing the Bowden wire forward far enough to cause the slide 112 to be moved to operative declutching position. For this reason the recess is made relatively shallow.

However, when the drive disc 96 is moved axially by spring 150 the distance which it is free to move when drive pin 104 is brought into engagement with aperture 106, then the lever 126 will be swung counterclockwise far enough to draw stop 122 on the Bowden wire 120 into operative relation with the slide 112 and to advance the latter to operative declutching position. It will be observed, therefore, that the slide 112 will be moved to declutching position only when the drive pin 104 engages in aperture 106 and that the slide is moved to this position automatically under the influence of springs 148 and 150 when the drive disc 96 is advanced far enough relative to the driven disc 24 to bring the drive pin 104 opposite the aperture 106.

The other stop 124 on Bowden wire 120 operates against the slide 112 when the Bowden wire is retracted. This stop is so arranged that it will not move the slide 112 from operative declutching position until the Bowden wire 120 has been retracted a distance great enough to cause the lever 126 to carry lug 136 to the lower end of the inclined portion 144 of the cam slot. As a result the drive disc 96 will be fully retracted and will have retracted the drive pin 104 from driving engagement with the driven disc 24 when the declutching mechanism is released by the slide 112 and the flexible shaft moves into driving engagement with its power source under the influence of spring 54. Thereupon the drive disc is rotated so that it moves forward while the lever 126 completes its movement to fully retracted position and returns to its intermediate position under the influence of spring 148, but the driven disc remains stationary until the lever returns to the last mentioned position and releases the drive disc 96 for axial movement toward the driven disc.

To describe the operation of the cleaner, reference will first be made to Figs. 2 and 3 which show the parts in the position they assume when the cleaner is inoperative. It will be noted that drive pin 104 is in aperture 106 in the driven disc 24 and the slide 112, therefore, is in declutching position and that lost motion in a forward direction between the Bowden wire and slide has been taken up. Furthermore, the declutching lug 118 on drive disc 96 has rocked control plate 80 and lever 72 to a position at which the flexible drive shaft 40 is disengaged from its power source.

To start the cleaner the Bowden wire is fully retracted. Before lost motion between the wire and the slide 112 is taken up the lever 126 will be swung far enough to move the lug 136 to the lower end of the inclined portion 144 of the cam slot 138, thus causing the drive disc 96 to be retracted against the resistance of spring 150 and fully to withdraw the drive pin 104 from engagement with the aperture 106 in the driven disc 24 as seen in Fig. 4.

Upon further retraction of the Bowden wire sufficient to move the slide from the position shown in Fig. 2 to the position shown in Fig. 6, the declutching mechanism is released for return to inoperative position under the influence of adjusting spring 86 and thus releases the flexible shaft 40 for axial movement in a direction to engage clutch elements 50 and 52 under the influence of spring 54 as previously explained. While the Bowden wire is retracting the slide 112, the lug 136 moves in the arcuate portion 146 of the cam slot 138 and thus holds the drive disc 96 in retracted position. Thus the wiper operating mechanism including drive disc 96 starts rotating while the drive disc is out of driving engagement with the driven disc 24, so that the latter remains stationary, and, therefore, the drive pin 104 moves past the aperture 106.

Upon release of the Bowden wire, the torsion spring 148 rotates lever 126 counterclockwise until the lug 136 enters the lower end of the inclined portion of the cam slot 138. The drive disc 96 is then free to move axially under the influence of the spring 150 until the end of the pin 104 is brought into engagement with the side of driven disc 24. This has no effect on the driven disc 24 because the frictional restraint afforded by the wiper connected to this disc is sufficient to prevent movement of these parts while the pin 104 slides over the side of this disc. When the drive disc 96 has moved ahead far enough to bring the drive pin 104 opposite the recess 108 in the driven disc, the spring 150 moves the drive disc axially until the drive pin engages the bottom of recess 108, as seen in Fig. 8. This establishes a driving connection between the drive disc and driven disc and the latter thereupon rotates with the drive disc and oscillates the right-hand wiper blade.

At the time the pin 94 drops into recess 108 the operating mechanism 14 has moved forward 270° and has moved the left wiper blade (Fig. 1) from its parked position to its innermost position and approximately halfway back to its parked position so that it is displaced 90° out of phase in its stroke with respect to the position of the right-hand blade.

During the course of the counterclockwise movement of the lever 126 under the influence of springs 148 and 150 the Bowden wire 120 is advanced, but this has no effect on the slide 114 because the lost motion between the slide and Bowden wire is sufficient to accommodate for this movement, the recess 108 being shallow enough to prevent the drive disc 96 from moving forward far enough to cause the Bowden wire to become effective against the slide. The cleaner, therefore, continues to operate with the blades 90° out of phase in their stroke.

To discontinue operation of the cleaner the Bowden wire is first fully retracted and then released. Retraction of the Bowden wire again retracts the drive disc 96 to the position shown in Fig. 4 and thus fully withdraws the drive pin 104 from the recess 108. The frictional drag between the windshield and the blade connected to the driven disc 24 (right-hand blade in Fig. 1) causes this blade and the driven disc to stop; but since the slide 112 is in retracted position the flexible drive shaft 40 remains in driving engagement and drives the actuating shaft 18, drive disc 96, and rear crank arm 20, thus moving the drive pin 104 toward the aperture 106 in the driven disc 24 and continuing the oscillation of the left-hand blade. After approximately 90° of rotation of the actuating shaft 18 and drive disc 96, the drive pin 104 is brought opposite the aperture 106 in the driven disc and the spring 150 then moves the drive disc forward axially, forcing the drive pin into the aperture. This axial movement of the drive disc is sufficient to rock the lever 126 far enough to cause the Bowden wire to become effective against the slide 112 and to advance the latter to declutching position automatically. During this 90° movement of the drive disc 96 and rear crank arm 20, the left-hand blade is moved to the point at which this blade again is in phase with the right-hand blade. After the drive pin 104 engages in aperture 106, movement of the two blades continues in phase until the lug 118 engages the slide 112 and discontinues operation of the cleaner. As previously explained, this occurs when the blades reach their outermost position.

From the above description of the operation of the cleaner, the ease of controlling operation thereof will be apparent. In starting or stopping the cleaner it is merely necessary in either case to retract the Bowden wire fully and then release the same inasmuch as the spring 148 thereupon automatically rotates the lever 126 counterclockwise far enough to release the drive disc 96 for axial movement under the influence of spring 150, thus further rotating the lever 126. This draws the Bowden wire 120 forward a distance determined by whether the drive pin 104 drops into the aperture 106 or recess 108. In the latter case which occurs when the cleaner is being started, the shallowness of the recess prevents the drive disc from moving far enough axially to cause the Bowden wire to advance the slide 112 to declutching position. However, when the drive pin engages in the aperture 106 then the drive disc moves far enough axially to move the lever 126 to inoperative position and incidentally cause the Bowden wire to advance the slide to declutching position, the spring 150 being strong enough to cause the slide to be operated. Thus the operation of the device is automatic after the Bowden wire has been fully retracted and then released.

Since the slide 112 can be moved forward to declutching position only when the drive pin 104 enters the aperture 106 in the driven disc, it will be apparent that the two wipers must always be brought into phase before operation of the cleaner can be discontinued irrespective of the position of the declutching lug 118 when the Bowden wire is retracted to stop the cleaner. This insures that both blades will always park at the same position relative to the windshield, i. e., at their outermost position.

Figure 9:
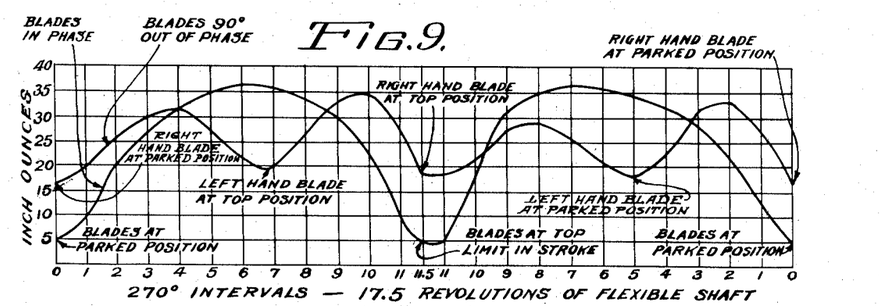
Fig. 9 is a graphic representation of the torque required to drive a conventional mechanically operated windshield in which the blades are driven in phase compared to the torque required to drive a cleaner of the same type in which the blades are driven in out-of-phase relation, one blade driving mechanism being 270° ahead of the other.

In Fig. 9 the variation in torque in inch ounces during the various phases in the cycle of operation of a windshield cleaner having two blades operating in phase with both blades at corresponding position in their stroke, and another cleaner of the same type having blades oscillating out of phase with the blades displaced 90° in their stroke, is graphically shown. The inch ounces of torque required to operate both cleaners is plotted against 270° intervals of rotation of the flexible drive shaft. The graph covers the movement of both blades through one complete cycle or stroke. It will be noted that a total of 23 revolutions of the flexible drive shaft are necessary to drive the wiper blades through one complete stroke.

In both cleaners the load on the flexible shaft varies generally sinusoidally. For the cleaner operating in a conventional manner the torque applied by the flexible shaft varies from approximately 5 inch ounces to approximately 36 inch ounces. For the improved cleaner of the present invention, the torque applied by the flexible shaft varies from a minimum of approximately 18 inch ounces to a maximum of approximately 36 inch ounces. It will be noted, therefore, that the maximum torque required to operate the two windshield cleaners is approximately the same. However, the variation between this maximum and the minimum torque required to oscillate the blades is much less in the cleaner of the present invention. Thus the amount of winding and unwinding of the core of the flexible shaft is greatly reduced in the cleaner of the present invention so that the shaft does not wear nearly as rapidly as the shaft in a cleaner operating in a conventional manner.

From the above description of the construction and operation of the improved windshield cleaner of the present invention, it will be apparent that wear on the flexible drive shaft is greatly reduced by oscillating the wiper blades out of phase. Furthermore, the pattern of operation of the blades is such that there are recurrent cycles of operation which is no more objectionable from the viewer's standpoint than operation of a standard cleaner with two blades operating in phase.

Operation of the blades out of phase is effected by mechanism of extremely simple construction which may be manufactured at little cost. Furthermore, parking of both blades at the same position relative to the windshield is not complicated by this mechanism and parking of both blades at the same position will always be effected regardless of the point in the cycle of operation in the cleaner at which the control for the parking means is operated.

While I have shown and described a preferred embodiment of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. A windshield cleaner comprising a pair of movable wiper elements, power driven wiper operating mechanism for oscillating said wiper elements, means operable temporarily to break the driving connection to one wiper element before said wiper operating mechanism starts oscillating the second of said wiper elements to cause the first of said elements to trail the second while the cleaner is operating, and operable before said wiper operating mechanism breaks the driving connection to said second wiper element to break the driving connection to said first wiper element while the second is moved to a corresponding position relative to the windshield, and a manually operable control to control operation of said wiper operating mechanism operable to condition the means for breaking the driving connection to the first wiper element for operating in the aforesaid manner when the control is operated to start and stop operation of the wiper operating mechanism.

2. A windshield cleaner comprising a pair of movable wiper elements, wiper operating means for oscillating said wiper elements, drive means to drive said operating means, means operable temporarily to break the driving connection to one of said wiper elements, a manually operable control to control operation of said drive means and the means for breaking the driving connection to one wiper element operable to condition the latter for breaking the driving connection to said one wiper element temporarily when the control is operated to start operation of the drive means so that said wiper elements are at different positions in their stroke when the cleaner is operating, and operable when the control is operated to discontinue operation of the drive means to cause said means for breaking the driving connection to one wiper element to become effective before operation of the drive means is discontinued long enough to cause the other of said wiper elements to be moved to a corresponding position relative to the windshield.

3. A windshield cleaner comprising a pair of movable wiper elements, separate power operated means for moving said wiper elements over said windshield to clean predetermined areas thereof, means for controlling operation of said power operated means including means to arrest operation of said power operated means and other means to render said separate power operated means effective in sequence so that one wiper element trails the other throughout their movement over the windshield and to interrupt operation of one of said power operated means and thereby interrupt operation of one of said wiper elements while the other is moved to a corresponding position relative to the windshield immediately before operation of both said power operated means is arrested so that the wiper elements stop at corresponding positions relative to the windshield, and manually operable means operable to condition said control means for operation in the aforesaid manner upon consecutive movements of the manually operable means.

4. A windshield cleaner comprising a pair of movable wiper elements, drive means including a rotatably driven shaft, a source of power to drive said shaft, clutch means to connect and disconnect said shaft and source of power, mechanism driven by said shaft for moving said wiper elements operatively connected to said shaft at a position to hold the wiper elements at corresponding parked positions relative to the windshield when the cleaner is inoperative, a manually operable control for said clutch means, means operated by said control when the latter is moved to cause said clutch to be engaged or disengaged to release part of said operating mechanism temporarily so that said wiper elements are at different positions in their stroke when the cleaner is operating and so that operation of one of said elements is interrupted before the clutch is disengaged long enough for the other wiper element to be moved to corresponding position relative to the windshield.

5. A windshield cleaner comprising a pair of movable wiper elements, separate operating mechanisms for moving each of said wiper elements over said windshield, a source of power to operate said operating mechanisms, separate clutch means including a first clutch means to connect both of said operating mechanisms to said power source and a second clutch means to release one of said operating mechanisms from said power source, and a single manually operable control for operating both said clutch means operable to release the second clutch means prior to the time the first clutch means is engaged or released for an interval long enough so that one wiper element starts moving before the other and precedes the other throughout the movement of said wiper elements over the windshield and to cause operation of one of said wiper elements to be interrupted before the first clutch is released long enough for the other wiper element to move to a corresponding position relative to the windshield.

6. A windshield cleaner as defined in claim 5, wherein a trip member is rotated in coordinated relation with the movement of said wiper elements and the clutch operating means includes a part movable into the path of rotation of said trip member and operatively engaged thereby to move said first clutch means to disengaged position when said wiper elements are both at one limit of their stroke.

7. A windshield cleaner comprising a pair of wiper elements adapted to be oscillated over a windshield to clean predetermined areas thereof, power driven wiper driving means, means to establish a driving connection between said wiper elements and driving means including lost motion means for causing one of said wiper elements to trail the other, manually operated means to control operation of said driving means, and means operated by said control when the latter is operated to discontinue operation of said driving means for causing lost motion to be taken up so that said wiper elements are brought to corresponding positions in their stroke before operation of the driving means is discontinued.

8. A windshield cleaner comprising a pair of oscillatable wiper elements, rotary drive means, means to establish a driving connection between said wiper elements and drive means including means reciprocated by said drive means, a lost motion connection between said drive means and the means reciprocated thereby to cause said wiper elements to oscillate out of phase, manually operated means to control operation of said drive means, and means operated by said control when the latter is operated to discontinue operation of said drive means to cause lost motion between said drive means and said reciprocatory means to be taken up before operation of the drive means is discontinued so that the wiper elements park at corresponding positions relative to the windshield.

9. A windshield cleaner as defined in claim 8, wherein the wiper elements are substantially 180° out of phase when they are in parked position and the lost motion means provides lost motion of approximately 270° between the drive means and the means reciprocated thereby when operation of said cleaner is started so that said wiper elements oscillate substantially 90° out of phase and provides lost motion of approximately 90° in the same direction when the control is operated to discontinue operation of the cleaner so that said wiper elements return to a position approximately 180° out of phase before the cleaner stops operating.

10. A windshield cleaner comprising a pair of oscillatable wiper elements, a rotary shaft, a source of power to drive said shaft, means for establishing a driving connection between the wiper elements and shaft including reciprocable members connected to said wiper elements to oscillate the latter and rotary means driven by said shaft for imparting reciprocatory movement to said reciprocable members, a lost motion driving connection between said rotary means and shaft to cause said rotary means to reciprocate said reciprocable member out of phase so that said wiper elements are at different positions in their stroke when the cleaner is operating, means drivingly to connect and disconnect said shaft and source of power, a manually operable control for said last mentioned means, and means operated by said control when the latter is operated to disconnect said shaft and power source to cause lost motion to be taken up before said shaft is disconnected so that said wiper elements stop at corresponding positions relative to the windshield.

11. A windshield cleaner comprising a pair of wiper elements adapted to be oscillated over a windshield to clean predetermined areas thereof, wiper driving means, a source of power to drive said wiper driving means, means drivingly to connect and disconnect said source of power and wiper driving means including a manually operable control, and means rendered effective by operation of said control to cause one wiper element to trail the other throughout movement of the wiper elements over the windshield and to cause the two wiper elements to be brought to corresponding positions in their stroke when said control is operated to disconnect said source of power and wiper driving means before the driving connection between said parts is broken.

12. A windshield cleaner comprising a pair of wiper elements adapted to be oscillated over a windshield to clean predetermined areas thereof, wiper driving means, a source of power to drive said wiper driving means, a control operable manually to control the application of power from said source to said wiper driving means, means to establish a driving connection between the wiper elements and driving means including delayed action means operable by said control when the latter is operated to cause power to be applied to said wiper driving means to connect one wiper element to said driving means at a predetermined interval after the other for causing said one element to trail the other in their movement over the windshield, and operable when said control is operated to discontinue the application of power to said wiper driving means to disconnect one wiper element from the driving means before application of power to said driving means ceases for an interval of sufficient duration to cause the other element to be brought to a corresponding position in its stroke.

13. A windshield cleaner comprising a pair of movable wiper elements, separate wiper operating means for operating said wiper elements, drive means to drive said operating means including means permanently connecting one of said operating means to said drive means and driving and driven elements, said driving element being in permanent driving connection with said drive means and said driven element being drivingly connected to the second wiper element, means to control operation of said drive means, means to bias said driving and driven elements relatively toward each other and said control means to a position to discontinue operation of said drive means, and means to establish a driving connection between said driving and driven elements when said wiper elements are either at predetermined noncorresponding or at predetermined corresponding positions relative to the windshield and to arrest movement of said driving and driven elements under the influence of said biasing means before the latter becomes effective to bias said control in a direction to discontinue operation of the cleaner except when said driving and driven means are at an operating position at which said wiper elements are in corresponding positions relative to the windshield.

14. A windshield cleaner comprising a pair of movable wiper elements, a rotatable drive shaft, means to establish a permanent driving connection between one of said wiper elements and said shaft, relatively movable driving and driven elements, said driving element having a permanent driving connection with said shaft and said driven element being connected to move said second wiper element, clutch means to connect said shaft and source of power biased to operative position, declutching mechanism to move said clutch means to inoperative position including a part movable to and from an operative position at which said declutching means is positioned for disengaging said clutch, means to bias said driving and driven elements relatively toward each other, means to apply the biasing force of said biasing means to the movable part of said declutching mechanism for urging the same to operative position, and means to establish a driving connection between said driving and driven elements when the wiper elements are either at predetermined noncorresponding or at predetermined corresponding positions relative to the windshield including means to limit movement of the driving and driven elements under the influence of said biasing means sufficiently to prevent the latter from biasing the movable part of said declutching means to operative position except when said driving and driven elements are at an operating position at which the two wiper elements are in corresponding positions relative to the windshield.

15. A windshield cleaner as defined in claim 14, wherein a trip member is rotated by said shaft in coordinated relation with said wiper elements and the part of the declutching means movable to condition the latter for operation is movable into the path of rotation of said trip member and is engaged thereby when both wiper elements are at one end of their stroke.

16. A windshield cleaner comprising a pair of wiper elements, rotary windshield wiper operating means including driving and driven means, a source of power to rotate said operating means, means for establishing a driving connection between one of the wiper elements and said driving means and between the other wiper element and said driven means, cooperating means on said driving and driven means movable between a first relative position at which a driving connection is established thereby between said driving and driven means for oscillating said wiper elements in a phase relationship at which the wiper elements are at noncorresponding positions in their stroke, and a second relative position at which a driving connection is established thereby between the driving and driven means for oscillating said wiper elements in a phase relationship at which the wiper elements are at corresponding positions in their stroke, control means operable to cause power to be applied to said wiper operating means and to discontinue the application of power thereto, and means operated by said control means when the latter is operated to apply power to said operating means to cause said cooperating means to move to said first relative position and to move to said second relative position when the control means is operated to discontinue the application of power to said operating means.

17. A windshield cleaner having relatively low and relatively constant power consumption, comprising a pair of wiper elements movable through back and forth strokes over respective areas of the windshield, a movable linkage positively interconnecting the wiper elements to position the latter a fraction of a stroke apart, and a single power operated motor means for moving the linkage to move the wiper elements simultaneously, with one element out of phase with the other by said fraction of a stroke.

18. A windshield cleaner having relatively low and relatively constant power consumption, comprising a pair of wiper elements movable through respective stroke cycles over the windshield, movable means positively linking the wiper elements to position them approximately one-fourth of a stroke cycle apart, and a single power operated motor means for moving the movable means to move the wiper elements simultaneously with one element out of phase with the other by approximately said one-fourth of a stroke cycle.

19. A windshield cleaner having a relatively low and relatively constant power consumption, comprising a pair of wiper elements reciprocable over respective areas of the windshield; a movable linkage interconnecting the elements including rotatable means having a pair of cranks spaced approximately at right angles, and a pair of means respectively connecting the cranks with the wiper elements; and power operated means for moving the linkage to rotate the cranks and thereby to move the wiper elements simultaneously with one element out of phase with the other by approximately one-fourth of a stroke cycle.

20. A windshield cleaner having a relatively low and relatively constant power consumption, comprising a pair of wiper elements reciprocable over respective areas of the windshield; a movable linkage interconnecting the elements including a pair of reciprocable means respectively connected to the elements, a pair of rotatable means to reciprocate the respective reciprocable means, and means nonrotatably connecting and positioning the rotatable means approximately at right angles to each other; and power operated means for moving the linkage to rotate the rotatable means and thereby to move the wiper elements simultaneously with one element out of phase with the other by approximately one-fourth of a stroke cycle.

ARTHUR C. ALLEN.

References Cited in the file of this patent

UNITED STATES PATENTS

| Number | Name | Date |
| --- | --- | --- |
| 1,719,660 | Horton | July 2, 1929 |
| 2,079,573 | Lauer | May 4, 1937 |